(12) United States Patent
Chretien et al.

(10) Patent No.: US 11,130,083 B2
(45) Date of Patent: Sep. 28, 2021

(54) FUEL FILTER

(71) Applicant: Ford Global Technologies, LLC, Dearborn, MI (US)

(72) Inventors: Paul Chretien, Commerce Township, MI (US); Carlos Armesto, Canton, MI (US); Guido Barta, Clarkston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 850 days.

(21) Appl. No.: 14/925,456

(22) Filed: Oct. 28, 2015

(65) Prior Publication Data

US 2016/0215740 A1 Jul. 28, 2016

Related U.S. Application Data

(60) Provisional application No. 62/107,678, filed on Jan. 26, 2015.

(51) Int. Cl.
*B01D 35/30* (2006.01)
*F02M 37/32* (2019.01)
*F02M 37/22* (2019.01)
*B01D 36/00* (2006.01)

(52) U.S. Cl.
CPC .......... *B01D 35/30* (2013.01); *B01D 35/308* (2013.01); *B01D 36/003* (2013.01); *F02M 37/22* (2013.01); *F02M 37/32* (2019.01); *B01D 2201/301* (2013.01); *B01D 2201/302* (2013.01); *B01D 2201/50* (2013.01); *B01D 2201/60* (2013.01)

(58) Field of Classification Search
CPC ........ F02M 37/22; F02M 37/32; B01D 35/30; B01D 36/003; B01D 35/308; B01D 2201/60; B01D 2201/50; B01D 2201/301; B01D 2201/302
See application file for complete search history.

(56) References Cited

U.S. PATENT DOCUMENTS

| | | | |
|---|---|---|---|
| 5,382,359 A | 1/1995 | Brandt | |
| 5,498,372 A * | 3/1996 | Hedges | C08K 9/08 106/472 |
| 5,922,199 A | 7/1999 | Hodgkins | |
| 6,099,726 A | 8/2000 | Gembolis et al. | |
| 6,168,713 B1 | 1/2001 | Sekine et al. | |
| 6,245,231 B1 | 6/2001 | Maki et al. | |
| 6,613,227 B2 | 9/2003 | Rickle | |
| 7,767,086 B2 | 8/2010 | Koch et al. | |

(Continued)

FOREIGN PATENT DOCUMENTS

| | | |
|---|---|---|
| CN | 1913950 A | 2/2007 |
| CN | 201209468 Y | 3/2009 |

(Continued)

*Primary Examiner* — Walter D. Griffin
*Assistant Examiner* — Angel Olivera
(74) *Attorney, Agent, or Firm* — Geoffrey Brumbaugh; McCoy Russell LLP

(57) ABSTRACT

Embodiments for a fuel filter are provided. In one example, a diesel fuel filter comprises a header having an inlet port, an outlet port, a recirculation inlet port, and a recirculation outlet port; and a filter body made having different material than the header, the filter body coupled with the header and housing a filter membrane. In this way, electrostatic discharge may be reduced.

19 Claims, 5 Drawing Sheets

(56) References Cited

U.S. PATENT DOCUMENTS

| | | | | |
|---|---|---|---|---|
| 2002/0078829 A1* | 6/2002 | Scardino | ............... | B01D 53/02 |
| | | | | 96/147 |
| 2002/0128373 A1* | 9/2002 | Park | ...................... | C08K 5/092 |
| | | | | 524/495 |
| 2013/0001125 A1* | 1/2013 | Zachovalova | ......... | B01D 35/30 |
| | | | | 206/524.2 |
| 2013/0248435 A1 | 9/2013 | Byrd et al. | | |

FOREIGN PATENT DOCUMENTS

| | | |
|---|---|---|
| CN | 202531313 U | 11/2012 |
| CN | 203305837 U | 11/2013 |
| CN | 103552525 A | 2/2014 |
| CN | 203637745 U | 6/2014 |
| DE | 102012213163 A1 | 1/2014 |
| WO | 2014016319 A1 | 1/2014 |

* cited by examiner

FUEL FILTER

CROSS REFERENCE TO RELATED APPLICATION

The present application claims priority to U.S. Provisional Patent Application No. 62/107,678, entitled "Fuel Filter," filed on Jan. 26, 2015, the entire contents of which are hereby incorporated by reference for all purposes.

FIELD

The present application relates to devices and systems for managing static electricity that may build up when filtering the fuel of a diesel engine.

BACKGROUND AND SUMMARY

Engines may be configured to operate using diesel fuels. There is typically at least one fuel filter arranged in the fuel system to filter out particles which may be in the diesel fuel. For diesel fuel distribution in automotive fuel systems, electrostatic discharge (ESD) is a concern. When diesel fuel flows through tubing and components of various materials, electric charge accumulation may occur under certain conditions. As such, certain discharges of the accumulated electric charge may degrade electronic components in the vicinity of the electric discharge, for example. Further, the electric discharge may affect performance and/or structural components of the fuel filter itself, thereby degrading the fuel filter and reducing the filtering efficacy of the fuel filter.

Techniques to mitigate problems associated with electrostatic buildup with fuel filters have been attempted. One example approach is disclosed in US Patent Publication 2013/0248435. The disclosure provides a static dissipation sleeve that is disposed around the outside of a fuel pump within a fuel filter assembly. The static dissipation sleeve has one or more protrusion portions that protrude radially from the surface of the static dissipation sleeve and a bendable contact located at a sleeve axis to provide contacts for dissipation of static electricity.

The inventors herein have recognized several issues with this approach. For example, this approach may depend on proper installation and/or reassembly of the dissipation sleeve and/or proper positioning of the contacts. In addition, this approach may add at least one additional component to the filter assembly which may tend to add cost, weight, and/or volume to the engine. Embodiments in accordance with the present disclosure address these shortcomings.

In one example, the issues described above may be addressed by a diesel fuel filter comprising a header having an inlet port, an outlet port, a recirculation inlet port, and a recirculation outlet port, and a filter body comprised of a different material than a material of the header, the filter body coupled with the header and housing a filter membrane. The header may be composed of a conductive plastic composition that may further be used to dissipate electrical charge build up in the fuel lines. The header may be welded to the filter body.

As one example, the header may be composed of a first plastic material and may be electrically connected to ground, and the filter body may be composed of a second plastic material. Herein, the first plastic material may have increased ESD characteristics than the second plastic material thereby providing a more conductive path for the accumulated electric charge to be dissipated to the ground. In this way, by grounding the header alone, it may be possible to ground the entire fuel filter assembly without the need for any additional metal grounding components. Thus, any electrostatic charge build up in the fuel system may be effectively dissipated, thereby reducing ESD discharges and protecting the fuel filter and the associated electrical components from damages related to ESD discharges. Furthermore, since the header of the fuel filter alone is made from the higher conductive material, the cost of manufacturing may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
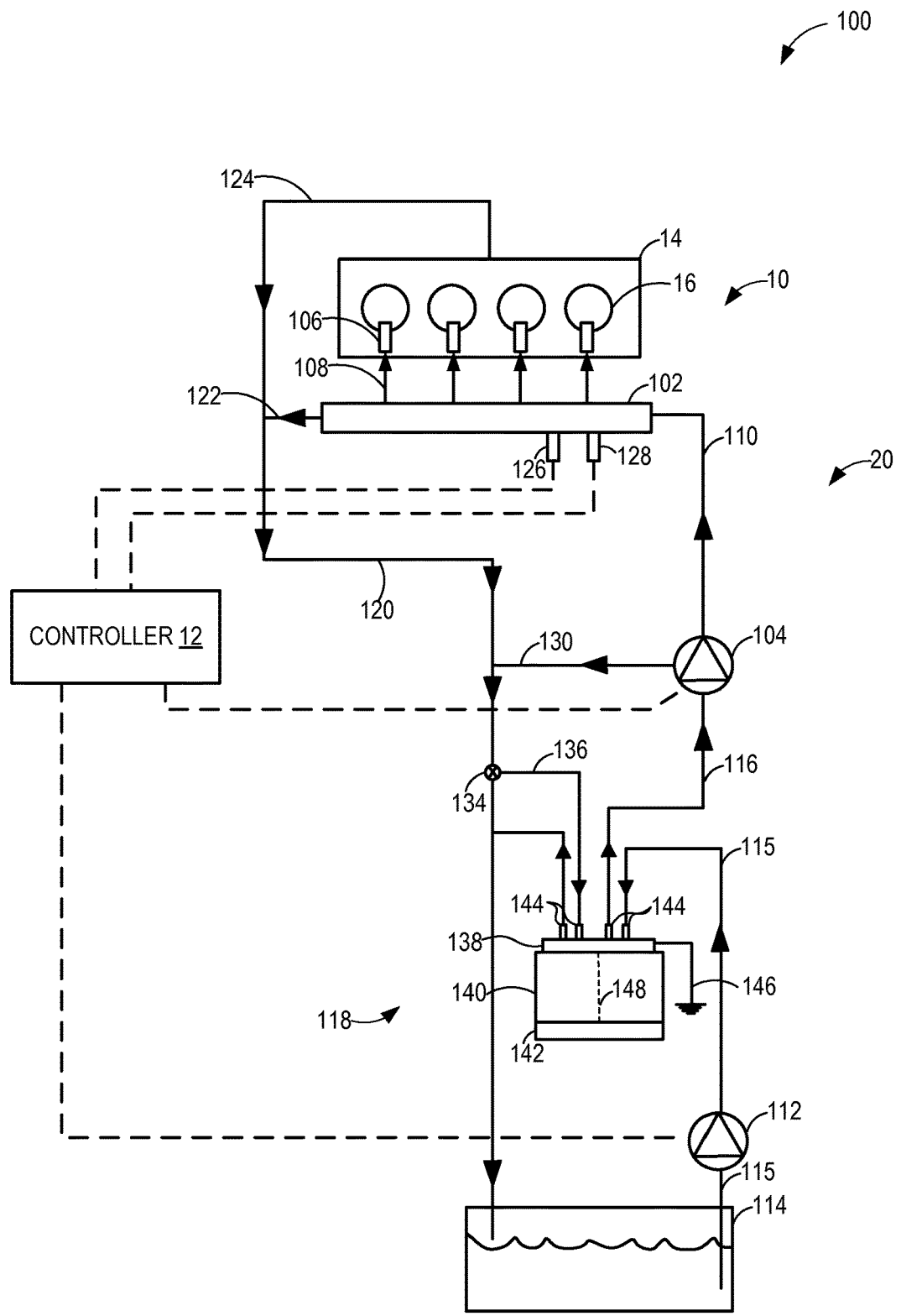
FIG. 1 shows an example vehicle system layout, including details of a fuel system.
Figure 2:
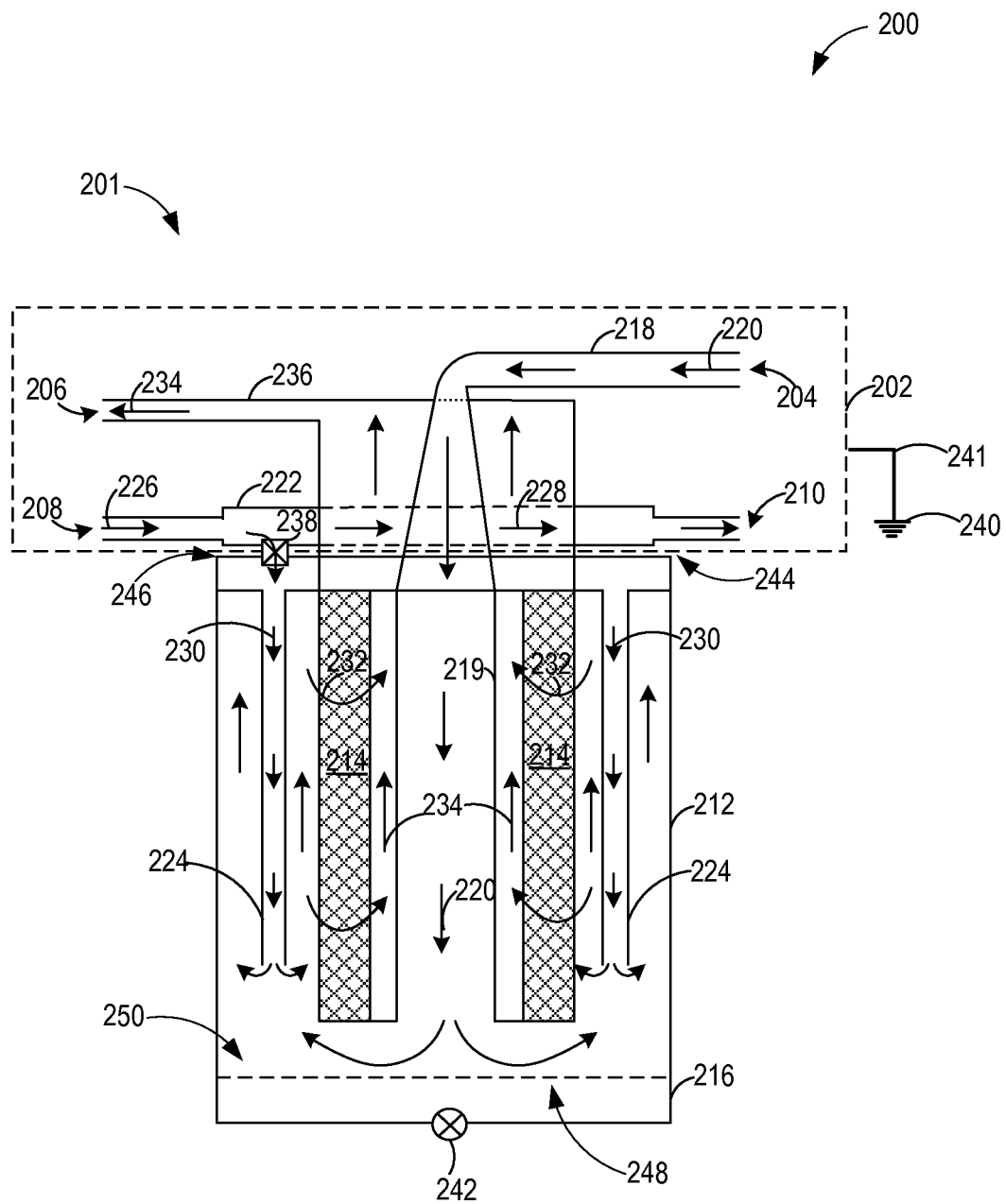
FIG. 2 shows a sectional view of a fuel filter included in the fuel system.
Figure 3A:
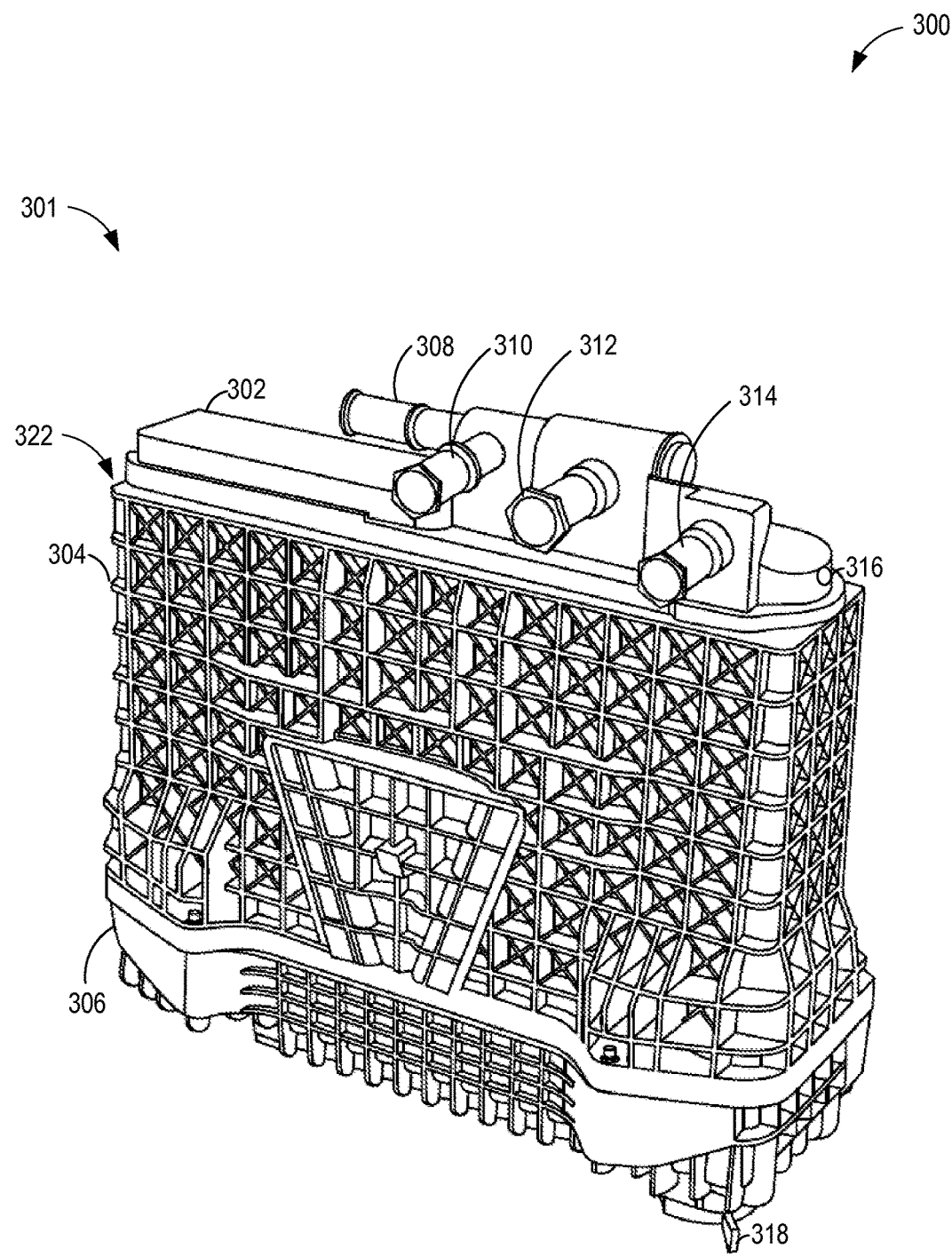
FIG. 3A is a perspective view illustrating selected details of the fuel filter in accordance with the present disclosure.
Figure 3B:
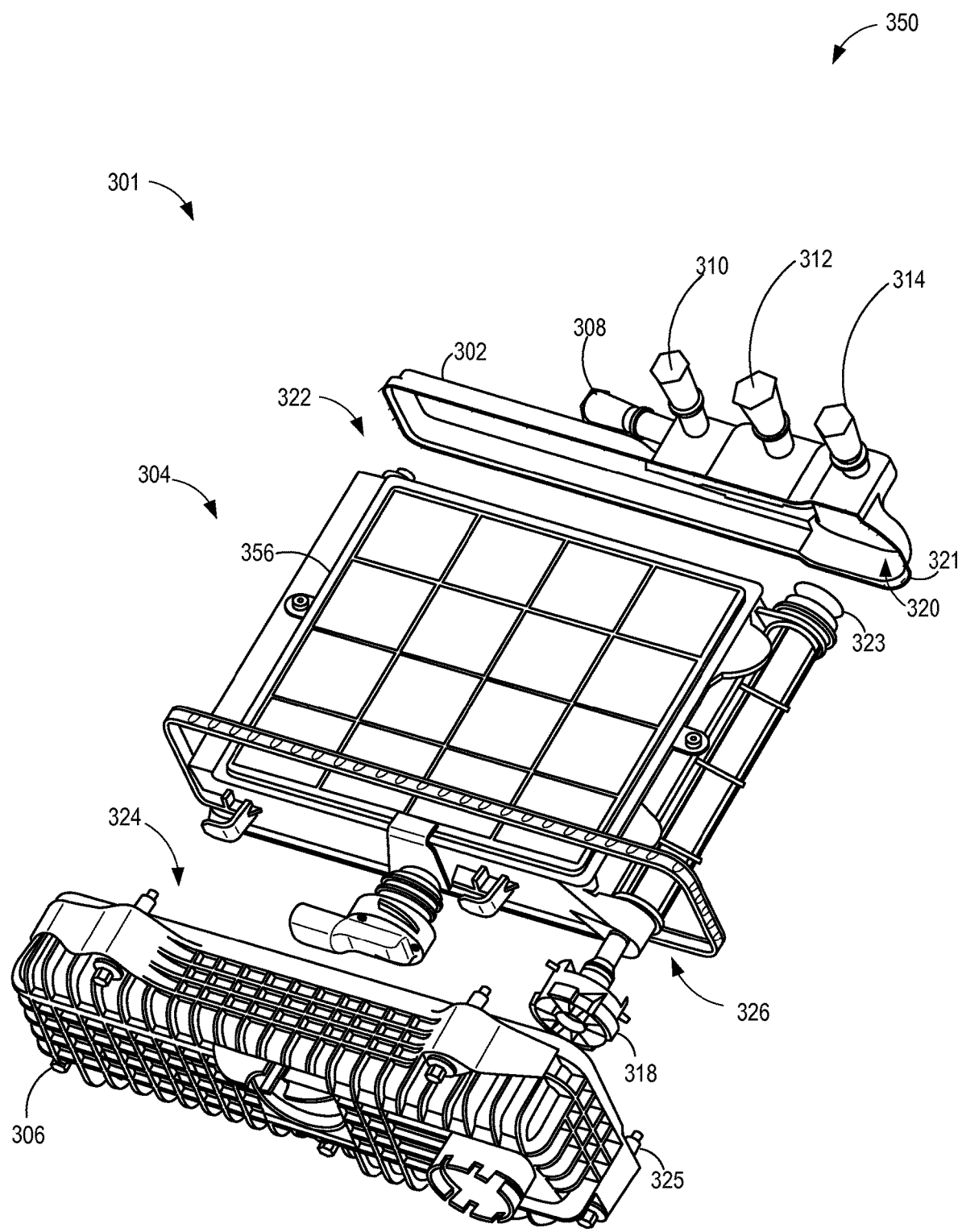
FIG. 3B is an exploded view of the fuel filter in accordance with the present disclosure.
Figure 3C:
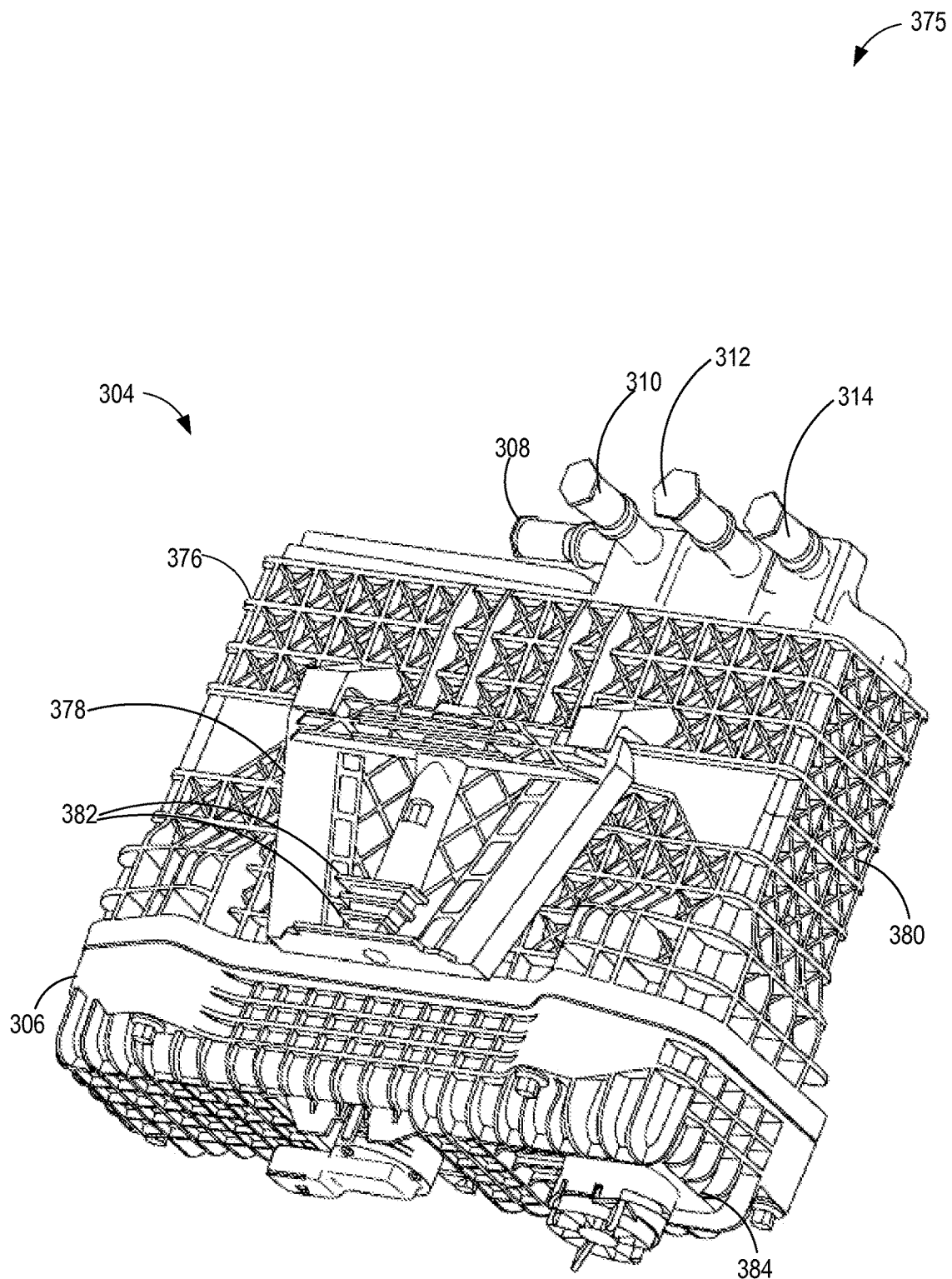
FIG. 3C is a perspective view illustrating selected details of the fuel filter in accordance with the present disclosure.

The following description relates to systems and methods for providing effective dissipation of static electricity buildup that may occur when filtering fuel for a combustion engine, for example diesel fuel for a diesel engine. An example vehicle system layout including a fuel filter is shown in FIG. 1. When fuel passes through the fuel filter, most of the contaminant in the fuel may be removed by the fuel filter, thus relatively clean fuel enters the engine systems, for example. As such, the fuel filter may include a plurality of ports for dirty fuel to enter and for clean fuel to exit the fuel filter as shown in FIG. 2. The plurality of ports may be included in a header that is grounded as shown in FIGS. 3A, 3B and 3C. The header may be made from a conductive plastic material that may be able to dissipate the electrostatic charge build up in the fuel system, while the filter body of the filter may be made from a less expensive, less conductive material. In this way, by grounding the header, the fuel system may be grounded, thereby reducing any charge build up and also reducing damages to the underlying electronics and the fuel filter.

FIG. 1 depicts an example vehicle system 100. In the depicted embodiment, vehicle system 100 is a diesel-fueled vehicle system. The driving force of the vehicle system 100 may be generated by engine 10. Engine 10 may include one or two banks 14. One bank 14 is indicated in the current example showing four cylinders 16. While engine 10 is shown as a 4-cylinder, four-stroke engine, it will be appreciated that the engine may have a different cylinder configuration (for e.g., in-line, V-shaped, or opposed) and/or a different number of cylinders (e.g., six, or eight).

Engine 10 of the vehicle system 100 may include a fuel system 20. Fuel system 20 may include a fuel rail 102, a supply pump 104, and fuel injectors 106. Fuel rail 102 may provide a chamber for holding fuel for subsequent injection into cylinders 16 through fuel injectors 106. In the depicted example, the fuel rail 102 may provide pressurized fuel to fuel injectors 106 of the bank 14 along high-pressure injector passages 108. Fuel rail 102 may include one or more fuel rail pressure sensors/switches 126 for sensing fuel rail pressures and one or more fuel rail temperature sensors 128 for sensing fuel rail temperatures and communicating the same with an engine controller 12. Only one fuel rail pressure sensor/switch 126 and one fuel rail temperature sensor 128 is shown for simplicity. Additional fuel rail pressure regulators may also be included. In the depicted example, fuel injectors 106 may be of the direct injection type, although it will be appreciated that they may alternately be of the port injection type. Further still, each cylinder 16 may include more than one injector, some of the injectors being of the direct injection type while others are of the port injection type.

Fuel may be pressurized by supply pump 104 and transferred to the fuel rail 102 along high-pressure rail passage 110. In one example, supply pump 104 may be driven by the rotation of engine 10, such as by an engine crankshaft and/or an engine camshaft. Alternatively, supply pump 104 may be driven by an optional electric motor.

A low pressure feed pump 112 may be configured to draw low-pressure fuel from fuel tank 114 to pump it to a fuel filter 118 via fuel inlet line 115, and to the supply pump 104 via fuel outlet line 116. The fuel may move through the fuel filter 118 due to the pumping action of one or both of the low pressure feed pump 112 and the supply pump 104. As such, the fuel supplied to the supply pump, via the fuel filter 118, may hereinafter also be referred to as the supply fuel. Fuel entering the fuel filter 118 via fuel inlet line 115 may be dirty with contaminants such as particulates, water, wax, debris, and other sediments, and fuel filter 118 may be configured to filter the contaminants in the fuel thereby returning a relatively clean fuel (free of contaminants) to the supply pump 104.

Fuel rail 102 may also be configured to return fuel, and thereby reduce fuel pressure, into low pressure recirculation passage 120 via rail return flow passage 122. A pressure reducing valve at the rail outlet (not shown) may regulate the return flow of fuel from the fuel rail into recirculation passage 120. Similarly, fuel returned from injectors 106 may also be fed into recirculation passage 120 via injector return flow passage 124. Supply pump 104 may also be configured to return fuel, and thereby reduce fuel pressure into recirculation passage 120 via pump return flow passage 130. A pressure reducing valve at the pump's outlet (not shown) may regulate the return flow of fuel from the supply pump into the recirculation passage 120. As such, the fuel returned from the supply pump, injectors, and/or rail may hereinafter also be referred to as the return fuel. The return fuel may be heated by one or more engine components, for example the bank 14 of cylinders 16, or the fuel rail 102 and consequently be at a higher temperature than the supply fuel. The fuel recirculation passage 120 may include a return fuel line 136 coupled with the fuel recirculation passage 120 wherein the warmed return fuel may be directed through the fuel filter 118. In some cases return flow fuel may be heated via other means, for example by a heater.

A fuel recirculation valve 134 may be configured to selectively direct selected amounts of the return fuel to the fuel filter 118. Fuel recirculation valve 134 may be a temperature sensitive valve, or an additional valve (not shown) may be included and may be configured to direct at least part of a flow from the return fuel line 136 to the fuel filter 118 when a temperature of the flow is within a preselected range. The fuel recirculation valve 134 may selectively direct various amounts of the return fuel to the fuel filter 118 depending on the temperature of the return fuel. Such control may, or may not be, operatively coupled with the controller 12.

Contaminants (such as water, wax, particulates, debris, other sediments, etc.) in the fuel may damage engine components and also corrode the sensitive injection systems and valves, and therefore it may be desirable to filter such components out from the fuel, via, for example, the fuel filter 118. Fuel filter 118 may filter out most of the contaminants and combustion residues from the fuel, thereby ensuring that clean fuel reaches the engine. The fuel filter 118 may include a header 138, a filter body 140 that houses a filter membrane 148, and a lower bowl 142. Water in the diesel fuel may get collected in the lower bowl 142, and may be drained out of the fuel filter 118, for example. The header 138 may further include a plurality of ports 114 through which fuel may enter and exit the fuel filter 118. The working of the fuel filter 118 is described in detail with reference to FIG. 2.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

When diesel fuel flows through fuel lines and the fuel filter, electric charge may begin to accumulate along the fuel lines. As such, any unwarranted discharge of this accumulated electric charge may cause damage to electronics in the vicinity, and may further damage the fuel filter. In order to reduce electrostatic discharge (ESD) in the fuel system, the fuel system may be grounded, thereby providing a path for the accumulated charge to travel to the ground. The inventors have recognized that it may be possible to dissipate the accumulated charge to the ground by composing the header of a more conductive material than the rest of the fuel filter, and further electrically coupling the header to the ground. By grounding the header of the fuel filter, it may be possible for the accumulated charge to dissipate to ground when traversing the fuel filter, for example. Further, by having a filter body and/or other additional components of the fuel filter that are not made from the conductive material, manufacturing costs may be reduced.

Turning now to FIG. 2, a sectional view 200 illustrating selected details of an example fuel filter 201 is shown. The fuel filter 201 may be an example of the fuel filter 118 of FIG. 1. The fuel filter 201 may include a header 202, a filter body 212, and a lower bowl 216. The header 202 may be comprised of a different composition than the filter body 212 and the lower bowl 216, for example. The header composition may be more conductive than the filter body and the lower bowl composition. Further, the header may be grounded. This may allow electric charges built up in the fuel lines to dissipate to the ground when they pass through the header. The flow path of the fuel from the fuel tank to the fuel filter and then to the engine is described below.

Fuel from the fuel tank (or supply fuel) may enter the fuel filter 201 via an inlet port 204. As such, the arrows 220 indicate the direction of flow of cold fuel from the fuel tank into the fuel filter 201 via inlet line 218. Fuel from the engine (or return fuel) may also enter the fuel filter 201 via the recirculation inlet port 208. The flow path of the hot or warm fuel from the engine entering the fuel filter 201 is indicated by arrow 226. In some examples, the fuel filter 201 may further include a temperature sensitive valve 238 that may be operatively disposed between the recirculation inlet port 208 and a recirculation outlet port 210. The temperature sensitive valve 238 may be configured to direct at least part of a flow from conduit 222 to a plurality of return fuel conduits 224 when a temperature of the fuel is within a preselected range. For example, when the temperature of the fuel is above a threshold temperature, then the fuel may be directed into return fuel conduits 224 as indicated by arrows 230. However, if the temperature of the return fuel is below the threshold temperature, the fuel may be directed towards the recirculation outlet port 210 as indicated by arrows 228 and may thus exit the fuel filter 201 to be returned to the fuel tank, for example. In other examples, a recirculation valve (such as recirculation valve 134 of FIG. 1) may selectively direct various amounts of the return fuel to the fuel filter 201, depending on the temperature of the fuel. As such, the valves may, or may not, be operatively coupled with the controller 12.

The filter body 212 of the fuel filter 201 may house a filter membrane 214 that filters out the contaminants in the fuel. For example, the filter membrane 214 may include a semi-permeable membrane that permeably separates out water from the fuel. In some examples, the filter membrane 214 may additionally and/or alternatively include hydrophilic and/or hydrophobic surfaces. In some more examples, the filter membrane may additionally or alternatively include porous surfaces. As such, the filter membrane 214 may function to filter out contaminants from the fuel and ensure that relatively clean fuel enters the engine systems.

The filter body 212 may further include fuel line conduit 219 axially traversing the filter membrane 214. The fuel line conduit (also referred to as the conduit) 219 of the filter body 212 may include an inlet in fluidic communication with the fuel inlet line 218 of the header 202. Fuel entering the fuel filter 201 via the inlet port 204 flows through the fuel inlet line 218 in the header 202, into the fuel line conduit 219 housed in the filter body 212. The header 202 may be hermetically sealed or welded onto the filter body 212, in such a way that fluidic communications may exist between the fuel inlet line in the header 202 and the fuel line conduit 219 housed inside the filter body 212, for example. In addition, the conduit 222 in the header 202 may fluidically connect the recirculation inlet port 208 and the recirculation outlet port 210. Additionally, the conduit 222 may be fluidically coupled to the return fuel conduits 224 in the filter body 212 via the temperature sensitive valve 238. Herein, the header 202 may be welded onto the filter body 212 such that the fluidic communication may exist between the inlet ports and the conduits of the header and the corresponding conduits in the filter body, for example. As such, a bottom surface 244 of the header may be in face-sharing contact with a top surface 246 of the filter body.

As such, the fuel entering the filter body 212 via the inlet port 204 may travel from the inlet line 218 into the conduit 219 as indicated by arrows 220 and may get filtered by the filter membrane (arrows 232, for example) and filtered fuel may exit the header via conduit 236 at outlet port 206 (as indicated by arrows 234) of the header 202. The return fuel entering the filter via the recirculation inlet port 208 and further entering the return fuel conduits 224 (when temperature is higher than the threshold, for example) may also get filtered by the filter membrane 214 and may exit the fuel filter at the outlet port 206 as indicated by arrows 234. However, if the return fuel is at a lower temperature, then it may exit the fuel filter at the recirculation outlet (or exit) port 210 as indicated by arrows 228, for example.

The fuel entering the filter body 212 either via the inlet port 204 or the recirculation inlet port 208, may enter a dirty side of the fuel filter 201, before being filtered by the filter membrane 214. Subsequently, the filtered fuel may enter a clean side of the fuel filter and further be redirected towards outlet port 206 via fuel line conduit 236 as indicated by arrows 234. As such, the filter membrane 214 may filter out contaminants such as dirt, water, rust particles, wax, and particulates, in the fuel, such that the fuel entering the engine system is relatively free of the contaminants. The fuel filter 201 may further include the lower bowl 216 which may collect water from the fuel that passes through the filter membrane 214. The lower bowl 216 may further include a valve and/or a port 242 through which collected water may be drained out of the fuel filter 118. Herein, a bottom surface 250 of the filter body (which is away from the top surface 246 of the filter body), may be in face-sharing contact with a top surface 248 of the lower bowl, for example. The filter body may be hermetically sealed onto the lower bowl. In this way, the fuel entering the fuel filter via the inlet ports may be filtered and clean fuel may be directed towards the outlet ports. According to embodiments disclosed herein, the header, the filter body and the lower bowl may be composed of different material, however hermetically sealed or welded together, as described in detail with reference to FIG. 3.

As described earlier, when diesel fuel flows through fuel lines and the fuel filter, electric charge may begin to accumulate along the fuel lines and may cause unwanted electrostatic discharge. In order to reduce electrostatic discharge (ESD) in the fuel system, the fuel system may be grounded, thereby providing a path for the accumulated charge to travel to the ground. The inventors have recognized that it may be possible to dissipate the accumulated charge to the ground by composing the header 202 of a more conductive material than the filter body and the lower bowl, and further electrically coupling the header 202 to a ground 240 via an electrical connection 241. As described above, the fuel in the fuel tank and the fuel lines travels to the engine system via the fuel filter. Thus, by grounding the header of the fuel filter, it may be possible for the accumulated charge to dissipate to ground when traversing the fuel filter, for example. In this way, by grounding the header of the fuel filter, it may be possible to discharge accumulated electric charge in the fuel lines, thereby reducing any damage to the electronic components and the fuel filter itself.

FIGS. 3A and 3C show perspective views of the fuel filter illustrating selected details of the fuel filter in accordance with the present disclosure. FIG. 3B shows an exploded view of the fuel filter illustrating selected details of the fuel filter in accordance with the present disclosure. Turning now to FIG. 3A, a perspective view 300 of an example fuel filter 301 is shown, to scale, although other relative dimensions may be used if desired. The fuel filter 301 may be an example of the fuel filter 118 of FIG. 1 and/or fuel filter 201 of FIG. 2. The fuel filter 301 may include a header 302 that may be made from a first plastic composition that may provide first ESD characteristics, for example. The header 302 may also include a plurality of ports through which liquid (hereafter also referred to as fuel) enters and exits the fuel filter 301, as explained earlier. The plurality of ports may include one or more of an inlet port 312, an outlet port 314, a recirculation inlet port 308, and a recirculation outlet port 310, for example. The fuel filter 301 may also include a filter body 304 (also referred to as upper body or main compartment of the fuel filter) made from a second plastic composition that may provide second ESD characteristics. The filter body 304 may be coupled with the header 302 such that the header 302 and the filter body 304 are hermetically (e.g., air-tight) coupled together. As such, the bottom surface 320 of the header 302 (shown in exploded view 350 of fuel filter 301 of FIG. 3B) may be in face-sharing contact with the top surface 322 of the filter body 304. Herein, a protruding surface 321 of the header 302 may be in face sharing contact with the top surface 322 of the filter body 304. Specifically, the top surface 322 (shown in FIGS. 3A and 3B) of the filter body 304 may refer to the top surface of a cover 376 of the filter body 304 (shown in FIG. 3C). The cover 376 may be configured to house the filter membrane and the conduits of the filter body and offer additional support to the fuel filter as explained later.

The protruding surface 321 of the header may be flush with the top surface 322. The protruding surface 321 and the bottom surface 320 of the header may together provide an enclosure for the conduits and fuel inlet and outlet lines coupling to the respective inlet and outlet ports of the header. As an example, a fuel conduit line connecting the inlet port of the header to the fuel line conduits located within the filter body may be situated within the enclosure. In some more examples, the ports on the header may be directly coupled to the fuel line conduits in the filter body when the protruding surface 321 is flush with the top surface 322 of the filter body, thereby ensuring fluidic coupling between the ports of the header and the fuel and fuel line conduits of the filter body. In such examples, the header 302 may be welded with the filter body 304 such that the ports are aligned with the corresponding fuel line conduits, and further aligned with the compartments within the filter body. As described earlier, the filter body 304 may be configured to house a filter membrane 356 (such as filter membrane 214 shown in FIG. 2) and further configured to receive fluid from the inlet port 312 and from the recirculation inlet port 308 and to transfer fluid to the outlet port 314 and to the recirculation outlet port 310. Cold fuel or fluid may enter the fuel filter 301 via the inlet port 312 and flow into an inlet line housed within the header 302 (through conduits located in the bottom surface 320 shown in FIG. 3B) and flow into a fuel line conduit housed within the filter body 304 (through conduits located in the top surface 322 shown in FIG. 3B). As such, inlet line of the header may be fluidically coupled to the fuel line conduit of the filter body. Fuel may then be filtered by filter membranes 356 (shown in FIG. 3B, housed inside the filter cover 376 shown in FIG. 3C) located inside the filter body 304 and any contaminants in the fuel may be filtered out of the fuel and clean fuel may exit out of the fuel filter via conduits located within the header 302, for example. Similar to the inlet line conduits, the conduits located inside the filter body 304 through which the filter fuel flows may be fluidically coupled to the conduits housed within the header 302 that transport the fuel to the outlet port 314 of the fuel filter 301. In some examples, the filter membrane 356 and the accompanying conduits located within the filter body may be configured to fit within the cover 376 (shown in FIG. 3C) and together be snapped fit or welded to the header 302. In some more examples, the filter membrane and the filter body may be attached to the header via a mounting head 323 located within the filter body and inside the cover 376.

Fuel returning from the engine may also be filtered at the fuel filter as explained earlier. Briefly, return fuel that is at temperature greater than a threshold temperature may enter the fuel filter 301 via the recirculation inlet port 308 and conduits housed inside the header 302, and flow fluidically into the return fuel conduits located inside the filter body 304 via a temperature sensitive valve. As such, the header 302 and the filter body 304 may be welded together such that the conduits located in the header 302 may be fluidically coupled to the return conduits inside the filter body 304. The return fuel may then be filtered by the filter membranes 356 located inside the filter body and subsequently flow out of the outlet port 314 of the header 302. However, return fuel that is at a temperature below the threshold temperature may exit out of the fuel filter via recirculation outlet port 310 and back into the fuel tank, for example.

As described earlier, the filter body 304 housing the filter membrane 356, may include the cover 376. As such the cover 376 may include ridges 380 all along the surface of the cover. The lower bowl 306 may also include ridges 384 along the surface. As such, the ridges 380 and 384 may be strengthening ribs offering structural strength to the filter body and lower bowl. The ridges 380 and 384 may be patterned and may additionally offer protection of the filter body and lower bowl from debris impacting the fuel filter during normal operation. Triangular and rectangular patterning of the ridges are shown as non-limiting examples of the ridges covering the filter body and the lower bowl. The fuel filter 301 may include a triangular piece 378 which may be a dovetail-like mounting feature that allows the fuel filter assembly to be attached to the fuel tanks via intermediary receiver brackets 382 which is welded to the fuel tank, for example. Other mounting options may also imagined without deviating from the scope of the disclosure.

The first ESD characteristics may discharge an electrical charge more readily than the second ESD characteristics discharge an electrical charge. With some embodiments the first plastic composition may include a higher concentration of carbon than the second plastic composition. The fluid may be fuel, oil, combinations thereof, or another fluid.

With some embodiments the filter 301 may also include a lower bowl 306 that may be fixed to the filter body 304. The lower bowl 306 made from a third plastic composition that may provide third ESD characteristics, wherein the first ESD characteristics discharge an electrical charge more readily than the third ESD characteristics discharge an electrical charge. The third plastic composition may be substantially the same composition as the composition of the first plastic composition. The third ESD characteristics may be substantially similar to the first ESD characteristics. With some embodiments the first plastic composition and the second plastic composition may be thermoplastic formulations that may have substantially the same base thermoplastic, while the first plastic composition may include additional carbon atoms, via a carbon-containing additive, for example. The filter body and the lower bowl may be fixedly joined by a plastic weld. Herein, a bottom surface 326 (shown in FIG. 3B) of the filter body (which is away from the top surface 322 of the filter body), may be in face-sharing contact with a top surface 324 of the lower bowl 306, for example. The filter body may be hermetically sealed onto the lower bowl.

With some embodiments the filter membrane (not shown) may have a clean side and a dirty side. The header 302 and the a lower bowl 306 may be joined at corresponding edges and surfaces such that a volume of fuel can only pass from the inlet port 312 to the outlet port 314 by first passing into the dirty side then through the filter membrane and to the clean side. In this way, the integrity of the dirty and clean sides of the filter may be precisely maintained.

With some embodiments the header 302 may include a grounding connection 316 for electrically grounding the filter to an engine block 14. Other grounding connections may be made. In some examples, the ground connection 316 may be electrically connected to a common engine/vehicle ground connection. By connecting the header to ground, any charge that is accumulated in the fuel lines may be dissipated to ground when the charge passes through the header for example. The technical effect of connecting the header to the ground is that the fuel system may be grounded and electric discharges occurring the fuel lines may be reduced.

Some embodiments may provide a diesel fuel filter 118 that may include a header 302 that may be made from a material having a first carbon concentration and having an inlet port 312, an outlet port 314, a recirculation inlet port 308, and a recirculation outlet port 310. The diesel fuel filter 118 may also include a filter body 304 that may be made from a material having a second carbon concentration, and that may be hermetically coupled with the header 302. The filter body 304 may be configured to house a filter membrane (not shown) and to receive fluid from the inlet port 312 and from the recirculation inlet port 308 and to transfer fluid to the outlet port 314 and to the recirculation outlet port 310. The first carbon concentration may provide greater ESD discharge characteristics than the second carbon concentration provides. The first carbon concentration may be higher than the second carbon concentration.

With some embodiments the material may be a plastic composition. The material may be a base thermoplastic and the header 302 may be made from a first thermoplastic formulation having the first carbon concentration. The filter body 304 may be made from a second thermoplastic formulation having the second carbon concentration.

Some embodiments may also include a lower bowl 306 that may be fixed to the filter body 304, the lower bowl made from a material having a third carbon concentration that may be substantially similar to a second carbon concentration.

Some embodiments may provide a diesel fuel filter 301 that may include a header 302 made from a first material having first electric discharge characteristics and having an inlet port 312, an outlet port 314, a recirculation inlet port 308 and a recirculation outlet port 310. The diesel fuel filter that may include a filter body 304 made from a second material having second electric discharge characteristics that may be less effective at discharging an electric charge than the first electric discharge characteristics. The filter body 304 may be hermetically coupled with the header 302 and may be configured to house a filter membrane and to receive fluid from the inlet port 312 and the recirculation inlet port 308 and to transport fluid to the outlet port 314 and to the recirculation outlet port 310. The first material may be a first plastic composition and may have a first concentration of carbon and the second material may be a second plastic composition having a second concentration of carbon.

The fuel filter 301 may include a water reservoir which may be configured to collect water from the fuel that passes through the filter 301. The water reservoir may include a valve and/or port 318 wherein the collected water may be let out from the filter 301. The port of the water reservoir is positioned with a central axis of the port in-line with the mounting head 323, the mounting head 323 attaching the filter membrane 356 and the filter body 304 to the header 302. The mounting head 323 is located within the filter body 304 and adjacent to the outlet port 314 of the header 302, as illustrated in FIG. 3B.

While the depicted example shows a single fuel filter, in alternate embodiments two or more filters may be included. Each filter may receive return fuel from respective recirculation branch passages. In one example, flow through each passage may be regulated by respective thermal recirculation valves. A pressure of fuel at the filter may be communicated to the engine controller 12 by a filter pressure sensor/switch (not shown) positioned at the outlet of the filter.

Thus, by composing the header with a more conductive material than the filter body, the material cost for manufacturing the fuel filter may be reduced. The technical effect of connecting the header to the ground may dissipate electric charge that may have accumulated in the fuel lines. In this way, unwanted electrostatic discharges that may result in damages to the electrical components and the fuel filter assembly may be avoided.

In some examples, the header may be formed as one piece. For example, the header may be manufactured via casting, injection molding, 3-D printing, or other suitable technique as one continuous piece. In other examples, the header may be formed as multiple pieces and welded or otherwise joined together.

In another representation, the fuel filter may be constructed by a method including forming a header having an inlet port, an outlet port, a recirculation inlet port and a recirculation outlet port from a first material, including selecting the first material to include a first concentration of an additive to promote electrostatic discharge, forming an upper body (also known as filter body) from a second material to house a filter membrane and to receive fluid from the inlet port and from the recirculation inlet port and to transmit fluid to the outlet port and to the recirculation outlet port, including selecting the second material to include a second concentration of the additive, wherein the first concentration is substantially greater than the second concentration, and attaching the header to the upper body or attaching the upper body to the header. Selecting the second material may include selecting a material to include substantially none of the additive, for example. The method may additionally and/or optionally include forming a lower bowl and attaching the lower bowl to the upper body. The method may further include selecting the additive to include carbon. The method may further include wherein the attaching the header to the upper body or attaching the upper body to the header includes welding the header to the upper body and wherein the forming the header and the forming the upper body includes using similar base thermoplastics which differ essentially only by the respective relative carbon concentrations.

The systems described above also provide for a diesel fuel filter comprising a header having an inlet port, an outlet port, a recirculation inlet port, and a recirculation outlet port; and a filter body comprised of a different material than a material of the header, the filter body coupled with the header and housing a filter membrane. In a first example of the diesel fuel filter, the filter may additionally or alternatively include wherein the header is comprised of a first plastic composition providing a first electrostatic discharge (ESD) characteristic, and the filter body is comprised of a second plastic composition providing a second ESD characteristic, the filter body hermetically coupled with the header and further configured to receive fluid from one or more of the inlet port and the recirculation inlet port of the header and to transfer fluid to one or more of the outlet port and the recirculation outlet port of the header, wherein the first ESD characteristic discharges an electric charge more readily than the second ESD characteristic discharges an electric charge and wherein the first plastic composition is mote electrically conductive than the second plastic composition. A second example of the diesel fuel filter optionally includes the first example and further includes wherein the first plastic composition includes a higher concentration of carbon than the second plastic composition. A third example of the diesel fuel filter optionally includes one or more of the first and the second examples and further includes a lower bowl fixed to the filter body, the lower bowl made from a third plastic composition providing a third ESD characteristic wherein the first ESD characteristic discharges an electrical charge more readily than the third ESD characteristic. A fourth example of the diesel fuel filter optionally includes one or more of the first through the third examples, and further includes wherein the third plastic composition is substantially the same composition as the composition of the first plastic composition and wherein the third ESD characteristic is substantially similar to the first ESD characteristic. A fifth example of the diesel fuel filter optionally includes one or more of the first through the fourth examples, and further includes wherein the first plastic composition and the second plastic composition are thermoplastic formulations having substantially the same base thermoplastic. A sixth example of the diesel fuel filter optionally includes one or more of the first through the fifth examples and further includes wherein the first plastic composition includes the base thermoplastic and a carbon additive. A seventh example of the diesel fuel filter optionally includes one or more of the first through the sixth examples, and further includes wherein filter membrane has a clean side and a dirty side, and wherein the header and the filter body are joined at corresponding edges and surfaces such that a volume of fuel can only pass from the inlet port to the outlet port by first passing into the dirty side then through the filter membrane and then to the clean side. An eighth example of the diesel fuel filter optionally includes one or more of the first through the seventh examples, and further includes wherein the header and the lower bowl are fixedly joined by a plastic weld. A ninth example of the diesel fuel filter optionally includes one or more of the first through the eighth examples, and further includes wherein the header includes a grounding connection for electrically grounding the filter to an engine block.

The systems described above also provide for a diesel fuel filter comprising a header comprised of a material having a first carbon concentration and having an inlet port, an outlet port, a recirculation inlet port, and a recirculation outlet port, and a filter body comprised of a material having a second carbon concentration hermetically coupled with the header and configured to house a filter membrane the first carbon concentration providing greater electrostatic discharge (ESD) characteristics than the second carbon concentration provides. In a first example of the diesel fuel filter, the filter may additionally or alternatively include wherein the material having the first carbon concentration and the material having the second carbon concentration are both a plastic composition. A second example of the diesel fuel filter optionally includes the first example and further includes wherein the material having the first carbon concentration and the material having the second carbon concentration are both a base thermoplastic and the header is comprised of a first thermoplastic formulation having the first carbon concentration and the filter body is comprised of a second thermoplastic formulation having the second carbon concentration. A third example of the diesel fuel filter optionally includes one or more of the first and the second examples, and further includes wherein the header further includes a grounding connection. A fourth example of the diesel fuel filter optionally includes one or more of the first through the third examples, and further includes wherein the filter body further includes a plurality of compartments to receive fluid from one or more of the inlet port and the recirculation inlet port and distribute fluid via one or more of the outlet port and the recirculation outlet port. A fifth example of the diesel fuel filter optionally includes one or more of the first through the fourth examples, and further includes a lower bowl, the lower bowl comprised of a material having a third carbon concentration substantially similar to the second carbon concentration. A sixth example of the diesel fuel filter optionally includes one or more of the first through the fifth examples, and further includes wherein the filter body is hermetically coupled to each of the lower bowl and the header.

The systems described above also provide for a diesel fuel filter comprising a header comprised of a first material having first electric discharge characteristics and having an inlet port, an outlet port, a recirculation inlet port and a recirculation outlet port, and a filter body made from a second material having second electric discharge characteristics less effective at discharging an electric charge than the first electric discharge characteristics hermetically coupled with the header and configured to house a filter membrane and to receive fluid from the inlet port and the recirculation inlet port and to transport fluid to the outlet port and to the recirculation outlet port. In a first example of the diesel fuel filter, the filter may additionally or alternatively include wherein the first material is a first plastic composition having a first concentration of carbon and the second material is a second plastic composition having a second concentration of carbon. A second example of the diesel fuel filter optionally includes the first example and further includes wherein the header further includes a grounding connection that dissipates accumulated electrostatic charge to ground.

The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A diesel fuel filter comprising:
   a header having an inlet port, an outlet port, a recirculation inlet port, and a recirculation outlet port; and a filter body comprised of a different material than a material of the header, the filter body coupled with the header and housing a filter membrane, the header comprised of a first plastic composition and the filter body comprised of a second plastic composition, the first and second plastic compositions being thermoplastic formulations having a same base thermoplastic and different carbon concentrations, the first plastic composition having a higher concentration of carbon than the second plastic composition and the first plastic composition and the second plastic composition including the base thermoplastic and a carbon additive.

2. The filter of claim 1, wherein
the higher concentration of carbon of the first plastic composition provides a first electrostatic discharge (ESD) characteristic; and
the second plastic composition has a lower concentration of carbon than the first plastic composition, the lower concentration of carbon of the second plastic composition providing a second ESD characteristic, the filter body hermitically coupled with the header and further configured to receive fluid from one or more of the inlet port and the recirculation inlet port of the header and to transfer fluid to one or more of the outlet port and the recirculation outlet port of the header, wherein the first ESD characteristic discharges an electric charge more readily than the second ESD characteristic discharges an electric charge and wherein the first plastic composition is more electrically conductive than the second plastic composition.

3. The filter of claim 2, wherein an outer surface of the filter body includes a triangular piece including a dovetail-like mounting feature that attaches the fuel filter to a fuel tank via an intermediary receiver bracket which is welded to the fuel tank.

4. The filter of claim 2, wherein the second plastic composition includes the base thermoplastic and none of the carbon additive.

5. The filter of claim 2, further comprising a lower bowl fixed to the filter body, the lower bowl made from a third plastic composition providing a third ESD characteristic wherein the first ESD characteristic discharges an electrical charge more readily than the third ESD characteristic.

6. The filter of claim 5, wherein the third plastic composition is the same composition as the composition of the second plastic composition.

7. The filter of claim 5, wherein the filter membrane has a clean side and a dirty side, and wherein the header and the filter body are joined at corresponding edges and surfaces such that a volume of fuel can only pass from the inlet port to the outlet port by first passing into the dirty side then through the filter membrane and then to the clean side.

8. The filter of claim 5, wherein the header and the lower bowl are fixedly joined by a plastic weld, wherein the header alone is made from a higher conductive material than the filter body.

9. The filter of claim 1, wherein the header includes a grounding connection for electrically grounding the filter to an engine block, wherein the header alone includes the grounding connection without additional metal grounding components arranged in the diesel fuel filter.

10. The diesel fuel filter of claim 9, wherein the filter body includes externally facing ridges all along its surface, the ridges including ribs, the header free of ribs.

11. The diesel fuel filter of claim 9, wherein the filter includes a water reservoir configured to collect water from fuel that passes there-through, the water reservoir including a port wherein the collected water may be let out from the filter, the port of the water reservoir positioned with a central axis in-line with a mounting head attaching the filter membrane and the filter body to the header, the mounting head located within the filter body and adjacent to the outlet port of the header.

12. The diesel fuel filter of claim 9, further comprising a lower bowl, the lower bowl comprised of the material with the second carbon concentration and wherein the material including the base thermoplastic and the lower carbon concentration of the carbon additive includes none of the carbon additive.

13. The diesel fuel filter of claim 12, wherein the filter body is hermetically coupled to each of the lower bowl and the header.

14. A diesel fuel filter comprising:
a header comprised of a material including a base thermoplastic and a first carbon concentration of a carbon additive and having an inlet port, an outlet port, a recirculation inlet port, and a recirculation outlet port; and
a filter body comprised of a material including the base thermoplastic and a second carbon concentration of the carbon additive, the filter body hermetically coupled with the header and configured to house a filter membrane and to receive fluid from one or more of the inlet port and the recirculation inlet port and to transfer fluid to one or more of the outlet port and the recirculation outlet port, the first carbon concentration providing greater electrostatic discharge (ESD) characteristics than the second carbon concentration provides, and wherein a bottom surface of the header is in face-sharing contact with a top surface of the filter body.

15. The diesel fuel filter of claim 9, wherein only the header further includes a grounding connection and wherein the material with the first carbon concentration is more electrically conductive than the material with the second carbon composition.

16. The diesel fuel filter of claim 15, wherein the filter body further includes a plurality of compartments to receive fluid from one or more of the inlet port and the recirculation inlet port and distribute fluid via one or more of the outlet port and the recirculation outlet port, the grounding connection being coupled to an engine block.

17. A diesel fuel filter comprising:
a header comprised of a first material having first electric discharge characteristics and having an inlet port, an outlet port, a recirculation inlet port, and a recirculation outlet port; and
a filter body comprised of a second material having second electric discharge characteristics less effective at discharging an electric charge than the first electric discharge characteristics, the filter body hermetically coupled with the header and configured to house a filter membrane and to receive fluid from the inlet port and the recirculation inlet port and to transport fluid to the outlet port and to the recirculation outlet port, wherein the first material is a first plastic composition including a base thermoplastic and a carbon additive, the first plastic composition having a first concentration of carbon and the second material is a second plastic composition including the base thermoplastic and having a second concentration of carbon.

18. The filter of claim 17, wherein the first concentration of carbon is higher than the second concentration of carbon and wherein the second plastic composition includes none of the carbon additive.

19. The filter of claim 17, wherein only the header further includes a grounding connection that dissipates accumulated electrostatic charge to ground.

\* \* \* \* \*